US008767001B2

(12) United States Patent
Choi et al.

(10) Patent No.: US 8,767,001 B2
(45) Date of Patent: Jul. 1, 2014

(54) METHOD FOR COMPENSATING DATA AND DISPLAY APPARATUS FOR PERFORMING THE METHOD

(75) Inventors: Nam-Gon Choi, Asan-si (KR); Bong-Im Park, Asan-si (KR); Byung-Kil Jeon, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 133 days.

(21) Appl. No.: 13/290,851

(22) Filed: Nov. 7, 2011

(65) Prior Publication Data

US 2012/0127191 A1 May 24, 2012

(30) Foreign Application Priority Data

Nov. 22, 2010 (KR) ........................ 10-2010-0116377

(51) Int. Cl.
*G09G 5/02* (2006.01)
*G06K 9/00* (2006.01)

(52) U.S. Cl.
USPC .......................................... 345/589; 382/167

(58) Field of Classification Search
None
See application file for complete search history.

(56) References Cited

U.S. PATENT DOCUMENTS

| | | | | |
|---|---|---|---|---|
| 5,793,501 | A * | 8/1998 | Murakami | 358/520 |
| 6,008,865 | A * | 12/1999 | Fogel | 348/700 |
| 6,700,559 | B1 * | 3/2004 | Tanaka et al. | 345/88 |
| 6,831,948 | B1 * | 12/2004 | Van Dijk et al. | 375/240.12 |
| 6,930,663 | B2 | 8/2005 | Sekiya et al. | |
| 8,134,532 | B2 * | 3/2012 | Baba et al. | 345/102 |
| 8,165,417 | B2 * | 4/2012 | Yamashita et al. | 382/274 |
| 8,390,656 | B2 * | 3/2013 | Muroi et al. | 345/690 |
| 2002/0012398 | A1 * | 1/2002 | Zhou et al. | 375/240.25 |
| 2002/0063536 | A1 * | 5/2002 | Koyama | 315/169.3 |
| 2002/0163490 | A1 * | 11/2002 | Nose | 345/89 |
| 2002/0186192 | A1 * | 12/2002 | Maruoka et al. | 345/87 |
| 2003/0128176 | A1 * | 7/2003 | Ham | 345/87 |
| 2004/0125063 | A1 * | 7/2004 | Lee et al. | 345/89 |
| 2004/0196274 | A1 * | 10/2004 | Song et al. | 345/204 |
| 2004/0246220 | A1 * | 12/2004 | Cheon | 345/89 |
| 2004/0252111 | A1 * | 12/2004 | Cheon et al. | 345/204 |
| 2005/0083353 | A1 * | 4/2005 | Maruyama et al. | 345/690 |
| 2005/0226526 | A1 * | 10/2005 | Mitsunaga | 382/274 |
| 2005/0237433 | A1 * | 10/2005 | Van Dijk et al. | 348/702 |

(Continued)

FOREIGN PATENT DOCUMENTS

| | | |
|---|---|---|
| KR | 10-2007-0009784 | 1/2007 |
| KR | 10-0739735 | 7/2007 |

OTHER PUBLICATIONS

English Abstract for Publication No. 10-2007-0009784.

(Continued)

*Primary Examiner* — James A Thompson
*Assistant Examiner* — Charles L Beard
(74) *Attorney, Agent, or Firm* — F. Chau & Associates, LLC

(57) ABSTRACT

A method of compensating data uses a look-up table divided into a first area, a second area and a boundary area between the first and second areas defined by a first previous reference value, a second previous reference value greater than the first previous reference value, a first current reference value and a second current reference value less than the first current reference value. A compensation data of a current frame is generated based on to which one of the first, second and boundary areas grayscale data of previous and current frames belongs.

16 Claims, 5 Drawing Sheets

(56) References Cited

U.S. PATENT DOCUMENTS

| | | | | |
|---|---|---|---|---|
| 2006/0044242 | A1* | 3/2006 | Park et al. | 345/89 |
| 2006/0044618 | A1* | 3/2006 | Mizoguchi | 358/3.23 |
| 2006/0050038 | A1* | 3/2006 | Cheon et al. | 345/89 |
| 2006/0050045 | A1* | 3/2006 | Maruoka et al. | 345/99 |
| 2006/0061828 | A1* | 3/2006 | Park | 358/300 |
| 2006/0103615 | A1* | 5/2006 | Shih et al. | 345/88 |
| 2006/0221029 | A1* | 10/2006 | Hsu et al. | 345/88 |
| 2006/0221030 | A1* | 10/2006 | Shih et al. | 345/88 |
| 2006/0267893 | A1* | 11/2006 | Kim et al. | 345/89 |
| 2007/0120794 | A1* | 5/2007 | Shin et al. | 345/89 |
| 2007/0247413 | A1* | 10/2007 | Maruyama et al. | 345/101 |
| 2007/0268242 | A1* | 11/2007 | Baba et al. | 345/102 |
| 2007/0279433 | A1* | 12/2007 | Huang | 345/601 |
| 2007/0296669 | A1* | 12/2007 | Jeon et al. | 345/89 |
| 2007/0299901 | A1* | 12/2007 | Hsu | 708/650 |
| 2008/0069479 | A1* | 3/2008 | Park et al. | 382/300 |
| 2008/0122874 | A1* | 5/2008 | Han et al. | 345/690 |
| 2008/0158454 | A1* | 7/2008 | Shin et al. | 349/36 |
| 2008/0159646 | A1* | 7/2008 | Katagiri et al. | 382/266 |
| 2008/0165106 | A1* | 7/2008 | Park et al. | 345/89 |
| 2008/0170051 | A1* | 7/2008 | Zhan et al. | 345/204 |
| 2008/0191995 | A1* | 8/2008 | Cheon et al. | 345/101 |
| 2008/0211755 | A1* | 9/2008 | Song et al. | 345/87 |
| 2008/0231547 | A1* | 9/2008 | Yagiura et al. | 345/4 |
| 2008/0238911 | A1* | 10/2008 | Chung et al. | 345/214 |
| 2008/0253455 | A1* | 10/2008 | Van Zon et al. | 375/240.16 |
| 2008/0297497 | A1* | 12/2008 | Lu et al. | 345/208 |
| 2009/0115907 | A1* | 5/2009 | Baba et al. | 348/672 |
| 2009/0153592 | A1* | 6/2009 | Choi et al. | 345/690 |
| 2009/0189840 | A1* | 7/2009 | Chu et al. | 345/89 |
| 2009/0195564 | A1* | 8/2009 | Jen et al. | 345/690 |
| 2010/0007597 | A1* | 1/2010 | Lee et al. | 345/99 |
| 2010/0020112 | A1* | 1/2010 | Jeon et al. | 345/690 |
| 2010/0026728 | A1* | 2/2010 | Miyazaki et al. | 345/690 |
| 2010/0033475 | A1* | 2/2010 | Choi et al. | 345/214 |
| 2010/0128024 | A1* | 5/2010 | Bae et al. | 345/214 |
| 2010/0156949 | A1* | 6/2010 | Park et al. | 345/690 |
| 2010/0156951 | A1* | 6/2010 | Park et al. | 345/690 |
| 2010/0289837 | A1* | 11/2010 | Hsu | 345/690 |
| 2011/0025680 | A1* | 2/2011 | Kim et al. | 345/214 |
| 2011/0057959 | A1* | 3/2011 | Park et al. | 345/690 |
| 2011/0080440 | A1* | 4/2011 | Cheon | 345/691 |
| 2011/0141088 | A1* | 6/2011 | Jeon | 345/211 |
| 2011/0176080 | A1* | 7/2011 | Toyooka | 349/41 |
| 2011/0227941 | A1* | 9/2011 | Huang | 345/596 |
| 2011/0242149 | A1* | 10/2011 | Yoshida et al. | 345/690 |
| 2011/0254759 | A1* | 10/2011 | Mori et al. | 345/88 |
| 2011/0254879 | A1* | 10/2011 | Mori et al. | 345/690 |
| 2011/0261093 | A1* | 10/2011 | Broughton et al. | 345/694 |
| 2011/0273439 | A1* | 11/2011 | Son et al. | 345/419 |
| 2011/0279466 | A1* | 11/2011 | Park et al. | 345/581 |
| 2011/0316900 | A1* | 12/2011 | Jeon et al. | 345/690 |
| 2012/0044427 | A1* | 2/2012 | Irie et al. | 348/731 |
| 2012/0081410 | A1* | 4/2012 | Yeo et al. | 345/690 |
| 2012/0105513 | A1* | 5/2012 | Shin et al. | 345/691 |
| 2012/0147162 | A1* | 6/2012 | Park et al. | 348/60 |
| 2012/0169780 | A1* | 7/2012 | Park et al. | 345/690 |
| 2012/0206500 | A1* | 8/2012 | Koprowski et al. | 345/690 |
| 2012/0218317 | A1* | 8/2012 | Choi et al. | 345/690 |
| 2012/0249405 | A1* | 10/2012 | Park et al. | 345/89 |
| 2012/0256904 | A1* | 10/2012 | Jung et al. | 345/419 |
| 2012/0320105 | A1* | 12/2012 | Ueno et al. | 345/690 |
| 2013/0010014 | A1* | 1/2013 | Hasegawa et al. | 345/690 |
| 2013/0027446 | A1* | 1/2013 | Nishida et al. | 345/697 |
| 2013/0093783 | A1* | 4/2013 | Sullivan et al. | 345/601 |

OTHER PUBLICATIONS

English Abstract for Publication No. 10-2007-0032108 (for 10-0739735).

* cited by examiner

METHOD FOR COMPENSATING DATA AND DISPLAY APPARATUS FOR PERFORMING THE METHOD

PRIORITY STATEMENT

This application claims priority under 35 U.S.C. §119 from Korean Patent Application No. 2010-116377, filed on Nov. 22, 2010 in the Korean Intellectual Property Office (KIPO), the contents of which are herein incorporated by reference in their entirety.

BACKGROUND OF THE INVENTION

1. Field of the Invention

Exemplary embodiments of the present invention are directed to a method of compensating data and a display apparatus for performing the method. More particularly, exemplary embodiments of the present invention are directed to a method of compensating data used in a liquid crystal display apparatus and a display apparatus for performing the method.

2. Description of the Related Art

In general, a liquid crystal display ("LCD") apparatus displays an image by exploiting optical and electrical characteristics of liquid crystal molecules. The liquid crystal molecules have an anisotropic refractivity and an anisotropic dielectric constant.

LCD devices are relatively thin, lighter in weight, and have a lower driving voltage and lower power consumption, etc., as compared to other display devices. As a result, the LCD device is widely used for various electronic devices such as display monitors, laptop computers, cellular phones, television sets, etc.

However, the response speed of a liquid crystal is slower than the time period corresponding to one display frame. This presents challenges in developing technology for displaying a moving image using an LCD device. Thus, to increase a response speed of a liquid crystal, an LCD device using an optically compensated band ("OCB") mode or a ferro-electric liquid crystal ("FLC") material has been developed.

In general, to use an OCB mode or an FLC, the liquid crystal material used in the LCD device should be changed or the structure of the LCD panel should be changed.

SUMMARY OF THE INVENTION

Exemplary embodiments of the present invention provide a method of compensating image data in which grayscale data of a current frame is compensated to enhance a response speed of a liquid crystal.

Exemplary embodiments of the present invention also provide a display apparatus for performing the above-mentioned method.

According to one aspect of the present invention, there is provided a method of compensating data. In the method, a look-up table is provided that is divided into a first area, a second area and a boundary area between the first and second areas. The first, second, and boundary areas are defined by a first previous reference value, a second previous reference value greater than the first previous reference value, a first current reference value and a second current reference value less than the first current reference value. Compensation data for a current frame is generated based on whether grayscale data of the current frame and of a previous frame satisfy a condition for one of the first, second or boundary areas.

In an exemplary embodiment, generating the compensation data may include generating a first compensation data when grayscale data of the previous and current frames satisfy the condition for the first area; generating a second compensation data when grayscale data of the previous and current frames satisfy the condition for the second area; and generating a third compensation data when grayscale data of the previous and current frames satisfy the condition for the boundary area.

In an exemplary embodiment, the condition for the first area may be that grayscale data of the previous frame has a value less than the first previous reference value and the grayscale data of the current frame has a value greater than a first current reference value. The condition for the second area may be that grayscale data of the previous frame has a value greater than the second previous reference value or grayscale data of the current frame has a value less than a second current reference value. The condition for the boundary area may be that grayscale data of the previous frame has a value between the first and second previous reference values and grayscale data of the current frame has a value greater than the second current reference values, or that grayscale data of the current frame has a value between the first and second current reference values and grayscale data of the previous frame has a value less than the second previous reference value.

In an exemplary embodiment, generating the third compensation data may include generating a fourth compensation data when grayscale data of the previous frame has a value between the first and second previous reference values and grayscale data of the current frame has a value greater than the first current reference value; generating a fifth compensation data when grayscale data of the previous frame is less than the first previous reference value and grayscale data of the current frame has a value between the first and second current reference values; and generating a sixth compensation data when grayscale data of the previous frame has a value between the first and second previous reference values and grayscale data of the current frame has a value between the first and second current reference values.

In an exemplary embodiment, the fourth compensation data is a function of the grayscale value of the current frame, the first compensation data, the first current reference value, a first preset reference data, and a difference between the first and second previous reference values. The fifth compensation data is a function of the grayscale value of the previous frame, the first compensation data, the first previous reference value, a second preset reference data, and a difference between the first and second current reference values. The sixth compensation data is a function of the grayscale values of the previous and current frames, the second compensation data, the first previous and current reference values, the first and second preset reference data, third and fourth preset reference data, and the differences between the first and second previous reference values and the first and second current reference values.

In an exemplary embodiment, the grayscale data may include red-grayscale data, green-grayscale data and blue-grayscale data, and the first to third compensation data may have the different values depending on the red, green and blue grayscale data values, respectively.

According to another aspect of the present invention, there is provided a method of compensating data. In the method, a first compensation data for a current frame is generated when grayscale data of a previous frame has a value less than a first previous reference value and grayscale data of a current frame has a value greater than a first current reference value. A second compensation data for the current frame is generated when grayscale data of the previous frame has a value greater than a second previous reference value greater than the first previous reference value or grayscale data of the current frame has a value less than a second current reference value less than the first current reference value. A third compensation data for the current frame is generated when grayscale data of the previous frame has a value between the first and second previous reference values and grayscale data of the current frame has a value greater than the second current reference values, or when grayscale data of the current frame has a value between the first and second current reference values and grayscale data of the previous frame has a value less than the second previous reference value.

In an exemplary embodiment, generating the third compensation data may include generating a fourth compensation data when grayscale data of the previous frame has a value between the first and second previous reference values and grayscale data of the current frame has a value greater than the first current reference value; generating a fifth compensation data when grayscale data of the previous frame is less than the first previous reference value and grayscale data of the current frame has a value between the first and second current reference values; and generating a sixth compensation data when grayscale data of the previous frame has a value between the first and second previous reference values and grayscale data of the current frame has a value between the first and second current reference values.

In an exemplary embodiment, the fourth compensation data is a function of the grayscale value of the current frame, the first compensation data, the first current reference value, a first preset reference data, and a difference between the first and second previous reference values. The fifth compensation data is a function of the grayscale value of the previous frame, the first compensation data, the first previous reference value, a second preset reference data, and a difference between the first and second current reference values. The sixth compensation data is a function of the grayscale values of the previous and current frames, the second compensation data, the first previous and current reference values, the first and second preset reference data, third and fourth preset reference data, and the differences between the first and second previous reference values and the first and second current reference values.

In an exemplary embodiment, the first compensation data may have one preset grayscale value.

In an exemplary embodiment, the second compensation data may be a varying function of the grayscale data of the previous frame and the grayscale data of the current frame.

According to another aspect of the present invention, a data compensation apparatus for compensating display data includes a frame memory and a compensation part The frame memory stores grayscale data of a previous frame. The compensation part includes a look-up table divided into a first area, a second area and a boundary area between the first and second areas. The first, second and boundary areas are defined by a first previous reference value, a second previous reference value greater than the first previous reference value, a first current reference value, and a second current reference value less than the first current reference value. The compensation part is configured to generate compensation data for the current frame based on whether grayscale data of the current frame and of the previous frame satisfy a condition for one of the first, second or boundary areas.

In an exemplary embodiment, the compensation part may be configured to generate a first compensation data when grayscale data of the previous and current frames satisfy the condition for the first area, generate a second compensation data when grayscale data of the previous and current frames satisfy the condition for the second area, and generate a third compensation data when grayscale data of the previous and current frames satisfy the condition for the third area.

In an exemplary embodiment, the condition for the first area may be that grayscale data of the previous frame has a value less than the first previous reference value and grayscale data of the current frame has a value greater than a first current reference value. The condition for the second area may be that grayscale data of the previous frame has a value greater than the second previous reference value or grayscale data of the current frame has a value less than a second current reference value. The condition for the boundary area may be that grayscale data of the previous frame has a value between the first and second previous reference values and grayscale data of the current frame has a value greater than the second current reference values, or that grayscale data of the current frame has a value between the first and second current reference values and grayscale data of the previous frame has a value less than the second previous reference value.

In an exemplary embodiment, the third compensation data may be include a fourth compensation data, a fifth compensation data, and a sixth compensation data. The data compensation part may be configured to generate the fourth compensation data when grayscale data of the previous frame has a value between the first and second previous reference values and grayscale data of the current frame has a value greater than the first current reference value, generate the fifth compensation data when grayscale data of the previous frame is less than the first previous reference value and grayscale data of the current frame has a value between the first and second current reference values, and generate the sixth compensation data when grayscale data of the previous frame has a value between the first and second previous reference values and grayscale data of the current frame has a value between the first and second current reference values.

In an exemplary embodiment, the fourth compensation data is a function of the grayscale value of the current frame, the first compensation data, the first current reference value, a first preset reference data, and a difference between the first and second previous reference values. The fifth compensation data is a function of the grayscale value of the previous frame, the first compensation data, the first previous reference value, a second preset reference data, and a difference between the first and second current reference values. The sixth compensation data is a function of the grayscale values of the previous and current frames, the second compensation data, the first previous and current reference values, the first and second preset reference data, third and fourth preset reference data, and the differences between the first and second previous reference values and the first and second current reference values.

In an exemplary embodiment, the data compensation apparatus may include a first data compensation part generating compensation data for red-grayscale data, a second data compensation part generating compensation data for green-grayscale data, and a third data compensation part generating compensation data for blue-grayscale data. Each of the first to third data compensation parts includes the frame memory and the compensation part.

In an exemplary embodiment, the data compensation apparatus includes a display panel for displaying images, a data driving part for converting the first to third compensation data into an analog data signal and for outputting the data signal to the display panel, and a gate driving part for outputting a gate signal to the display panel synchronized with the output of the data driving part.

According to an exemplary embodiment of a method of compensating data and a display apparatus for performing the method, compensation data are generated having different values based on grayscale data of a previous frame and grayscale data of a current frame, to enhance a response speed of a liquid crystal to reduce display defects generated at the boundary area.

DETAILED DESCRIPTION OF THE INVENTION

Hereinafter, the present invention will be explained in detail with reference to the accompanying drawings.

Figure 1:
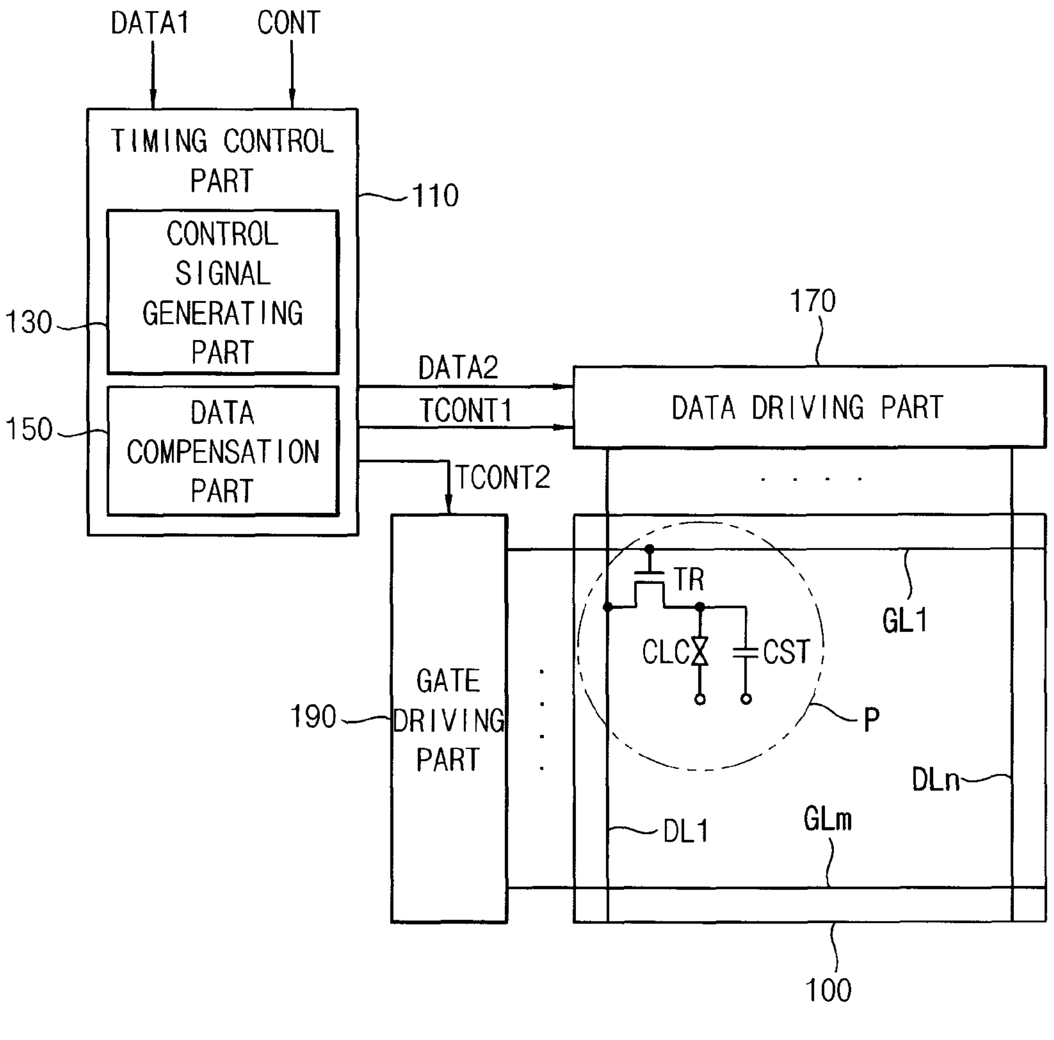
FIG. 1 is a block diagram showing a display apparatus according one exemplary embodiment of the present invention.

FIG. 1 is a block diagram showing a display apparatus according to an exemplary embodiment of the present invention.

Referring to FIG. 1, a display apparatus may include a display panel 100, a timing control part 110, a data driving part 170 and a gate driving part 190.

The display panel 100 includes a plurality of gate lines GL1 to GLm, a plurality of data lines DL1 to DLn, and a plurality of pixels P. Here, 'm' and 'n' are natural numbers. Each of the pixels P includes a driving element TR, a liquid crystal capacitor CLC electrically connected to the driving element TR and a storage capacitor CST electrically connected to the driving element TR. The display panel 100 may include two substrates opposite to each other and a liquid crystal layer interposed between the two substrates.

The timing control part 110 may include a control signal generation part 130 and a data compensation part 150.

The control signal generation part 130 generates a first timing control signal TCONT1 for controlling a driving timing of the data driving part 170 and a second timing control signal TCONT2 for controlling a driving timing of the gate driving part 190 using a control signal CONT received from an external device (not shown). The first timing control signal TCONT1 may include a horizontal start signal, an inversion signal, an output enable signal, etc. The second timing control signal TCONT2 may include a vertical start signal, a gate clock signal, an output enable signal, etc.

The data compensation part 150 includes a look-up table ("LUT") in which predetermined compensation data are stored. The LUT may be divided into a first area, a second area and a boundary area between the first and second areas using a first previous reference value, a second previous reference value greater than the first previous reference value, a first current reference value and a second current reference value less than the first current reference value. The data compensation part 150 generates a first compensation data, a second compensation data and a third compensation data based on to which of the first, second and boundary areas grayscale data of previous and current frames belongs.

For example, when the grayscale data of the previous frame is less than the first previous reference value and the grayscale data of the current frame is greater than the first current reference value, the data compensation part 150 generates the first compensation data. When grayscale data of the previous frame is greater than a second previous reference value greater than the first previous reference value, or grayscale data of the current frame is less than a second current reference value less than the first current reference value, the data compensation part 150 generates the second compensation data. When grayscale data of the previous frame has a value between the first and second previous reference values and grayscale data of the current frame has a value greater than the first current reference value, or the grayscale data of the current frame has a value between the first and second current reference values and grayscale data of the previous frame has a value less than the first previous reference value, the data compensation part 150 generates a third compensation data by using preset reference data.

The data driving part 170 converts the compensation data for the current frame received from the data processing part 150 into an analog data voltage. The data driving part 170 outputs the data voltage to the data lines DL1 to DLn.

The gate driving part 190 outputs gate signals to the gate lines GL1 to GLm that are synchronized with the output of the data driving part 170.

Figure 2:
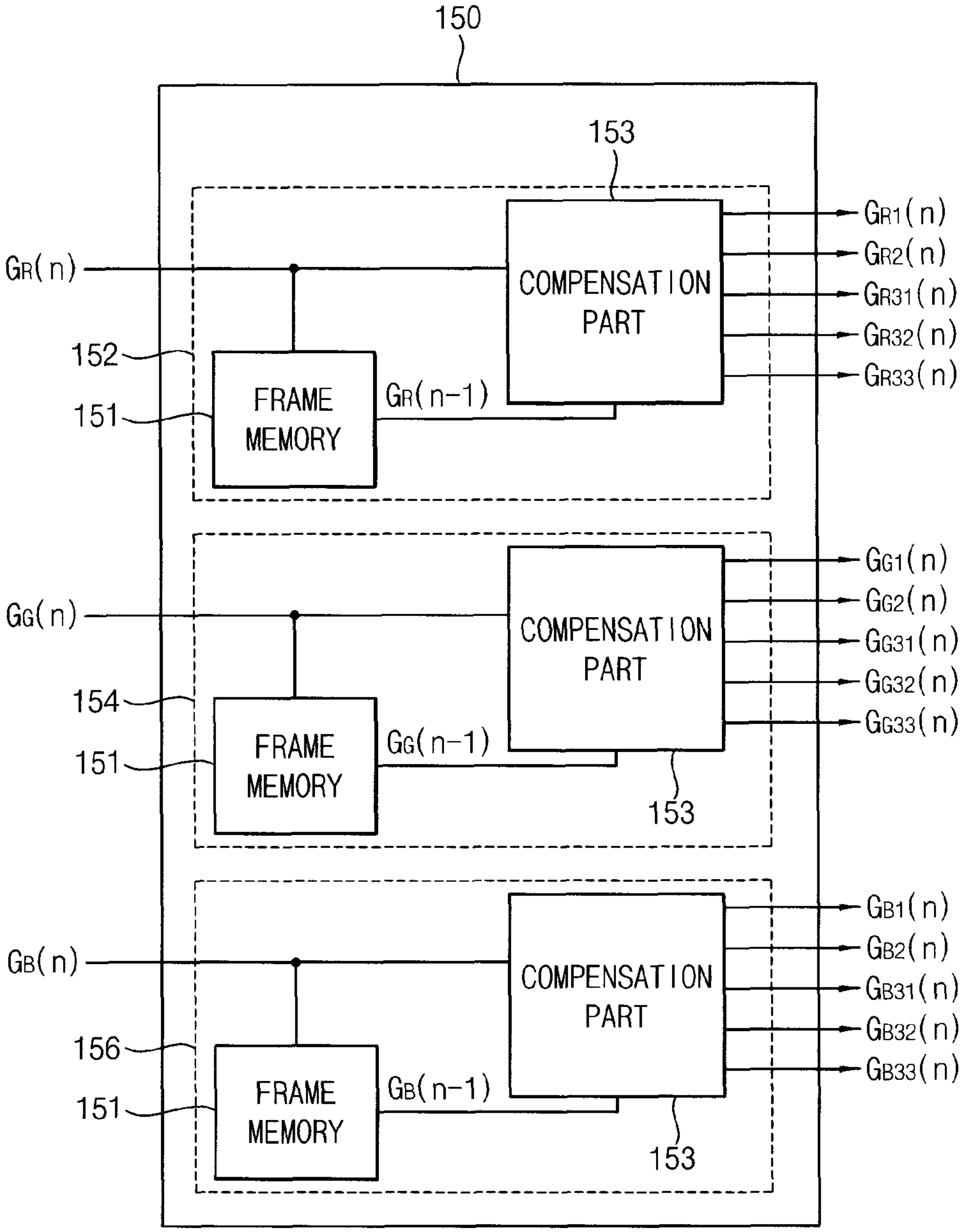
FIG. 2 is a block diagram showing a data compensation part as shown in FIG. 1.

FIG. 2 is a block diagram showing a data compensation part as shown in FIG. 1.

Referring to FIGS. 1 and 2, the data compensation part 150 may include a first data compensation part 152, a second data compensation part 154 and a third data compensation part 156. The grayscale data may include red R-grayscale data, green G-grayscale data and blue B-grayscale data.

The first data compensation part 152 compensates the R-grayscale data to generate an R-grayscale compensation data, and the second data compensation part 154 compensates the G-grayscale data to generate a G-grayscale compensation data. The third data compensation part 156 compensates the B-grayscale data to generate a B-grayscale compensation data.

The first data compensation part 152 includes a frame memory 151 and a compensation part 153. The second data compensation part 154 and the third data compensation part 156 also include frame memories 151 and compensation parts 153. Since the functionality of the frame memories and compensation parts of the second and third data compensation parts is substantially the same as those of the first data compensation part, any further repetitive detailed explanation thereof may hereinafter be omitted.

The frame memory 151 stores R-grayscale data of an n-th frame received from an external device (not shown). When the R-grayscale data $G_R(n)$ of the n-th frame is received, the frame memory 151 outputs R-grayscale data $G_R(n-1)$ of the (n−1)-th frame stored thereon.

The compensation part 153 receives R-grayscale data $G_R(n)$ of the n-th frame and R-grayscale data $G_R(n-1)$ of the (n−1)-th frame. The compensation part 153 includes a LUT to which R-gray scale data $G_R(n)$ of the n-th frame and R-grayscale data $G_R(n-1)$ of the (n−1)-th frame are mapped.

Figure 3:
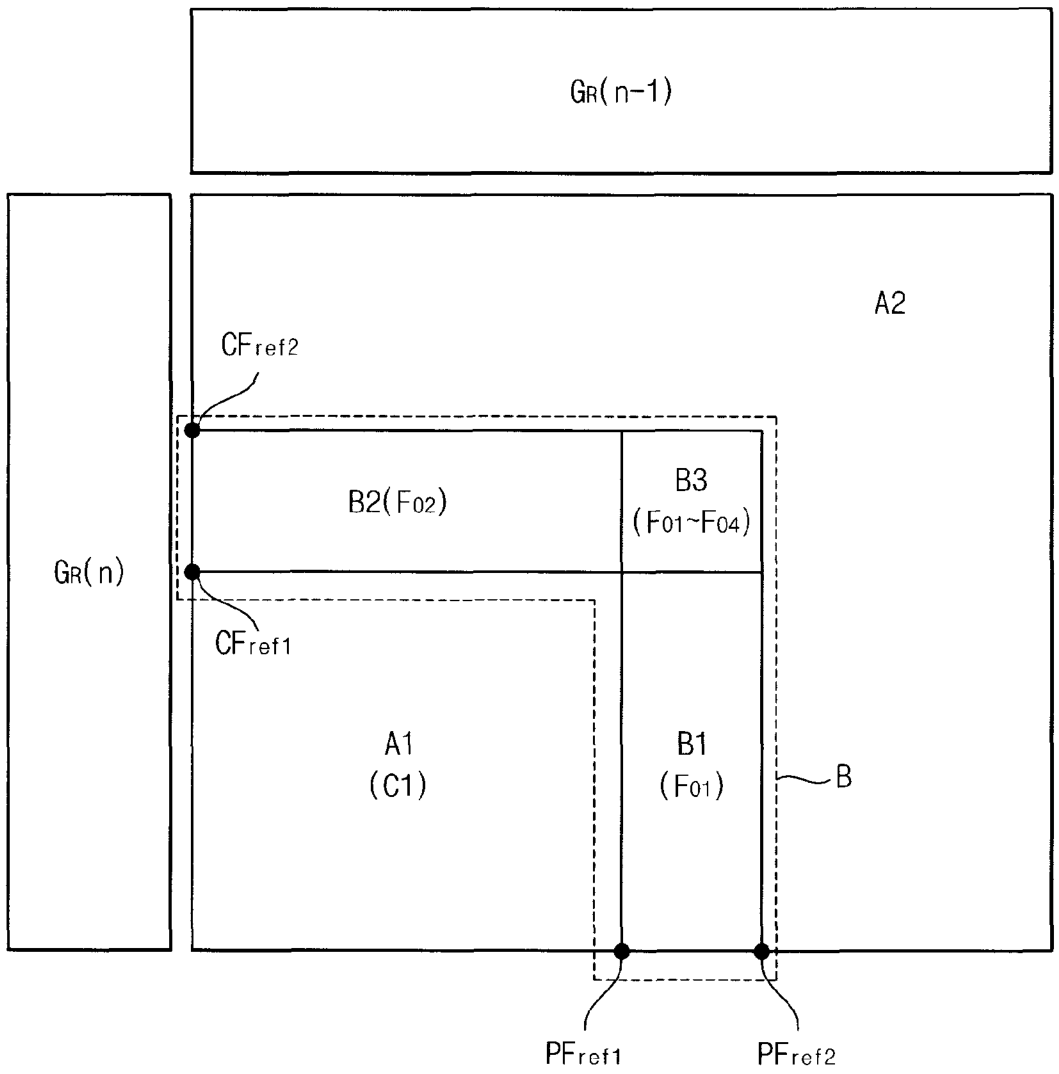
FIG. 3 is a conceptual diagram showing a look-up table included in a compensation part of FIG. 2.

FIG. 3 is a conceptual diagram showing a look-up table included in a compensation part of FIG. 2.

Referring to FIGS. 2 and 3, R-grayscale data $G_R(n-1)$ of an (n−1)-th frame are arranged along a horizontal direction of the LUT, and R-grayscale data $G_R(n)$ of an n-th frame are arranged along a vertical direction of the LUT. Values of $G_R(n-1)$ increase in the horizontal direction from left to right, and values of $G_R(n)$ increase in the vertical direction from top to bottom. Although not shown in FIGS. 2 and 3, R-grayscale data $G_R(n-1)$ of an (n−1)-th frame and R-grayscale data $G_R(n)$ of an n-th frame may be respectively sampled in a predetermined time interval. The LUT may be divided into a first area A1, a second area A2 and a boundary area B between the first and second areas A1 and A2.

The first area A1 is an area in which R-grayscale data $G_R(n-1)$ of the (n−1)-th frame is less than a first previous reference value $PF_{ref1}$ and R-grayscale data $G_R(n)$ of the n-th frame is greater than a first current reference value $CF_{ref1}$. That is, the first area A1 may correspond to compensating a pretilt method. The second area A2 is an area in which R-grayscale data $G_R(n-1)$ of the (n−1)-th frame is greater than a second previous reference value $PF_{ref2}$ or R-grayscale data $G_R(n)$ of the n-th frame is less than a second current reference value $CF_{ref2}$. That is, the second area A2 may correspond to compensating an over-driving method. The second previous reference value $PF_{ref2}$ is a grayscale greater than the first previous reference value $PF_{ref1}$, and the second current reference value $CF_{ref2}$ is a grayscale less than the first current reference value $CF_{ref1}$. A plurality of first compensation data C1 is mapped to the first area A1. The first compensation data C1 has identical grayscale values regardless of grayscale data $G_R(n)$ of the n-th frame and grayscale data $G_R(n-1)$ of the (n−1)-th frame. In other words, C1 is constant. A plurality of second compensation data C2 is mapped to the second area A2. The second compensation data C2 has different grayscale values depending on grayscale data $G_R(n)$ of the n-th frame and grayscale data $G_R(n-1)$ of the (n−1)-th frame. In other words, the value of C2 is a varying function of grayscale data $G_R(n)$ and grayscale data $G_R(n-1)$. The first and second compensation data may have a grayscale value from 0 to 1023.

The boundary area B may be divided into a first boundary area B1, a second boundary area B2 and a third boundary area B3. The first boundary area B1 corresponds to a case in which R-grayscale data $G_R(n-1)$ of the (n−1)-th frame is between the first and second previous reference values $PF_{ref1}$ and $PF_{ref2}$ and R-grayscale data $G_R(n)$ of the n-th frame is greater than the first current reference value $CF_{ref1}$. A first reference data $F_{01}$ is stored in the first boundary area B1. The second boundary area B2 corresponds to a case in which R-grayscale data $G_R(n-1)$ of the (n−1)-th frame is less than the first previous reference value $PF_{ref1}$ and R-grayscale data $G_R(n)$ of the n-th frame is between the first and second current reference values $CF_{ref1}$ and $CF_{ref2}$. A second reference data $F_{02}$ is stored in the second boundary area B2. The third boundary area B3 corresponds to a case in which R-grayscale data $G_R(n-1)$ of the (n−1)-th frame is between the first and second previous reference values $PF_{ref1}$ and $PF_{ref2}$ and R-grayscale data $G_R(n)$ of the n-th frame is between the first and second current reference values $CF_{ref1}$ and $CF_{ref2}$. The first and second reference data $F_{01}$ and $F_{02}$, a third reference data $F_{03}$ and a fourth reference data $F_{04}$ are stored in the third boundary area B3.

The compensation part 153 generates a first R-grayscale compensation data $G_{R1}(n)$, when the grayscale data $G_R(n)$ of the n-th frame and the grayscale data $G_R(n-1)$ of the (n−1)-th frame satisfy the conditions of the first area A1. The compensation part 153 generates a second R-grayscale compensation data $G_{R2}(n)$, when the grayscale data $G_R(n)$ of the n-th frame and the grayscale data $G_R(n-1)$ of the (n−1)-th frame satisfy the conditions of the second area A2.

The compensation part 153 generates third R-grayscale compensation data using the first to fourth reference data $F_{01}$, $F_{02}$, $F_{03}$ and $F_{04}$, when the grayscale data $G_R(n)$ of the n-th frame and the grayscale data $G_R(n-1)$ of the (n−1)-th frame satisfy the conditions of the boundary area B. The third R-grayscale compensation data includes a fourth R-grayscale compensation data $G_{R31}(n)$, a fifth R-grayscale compensation data $G_{R32}(n)$ and a sixth R-grayscale compensation data $G_{R33}(n)$.

For example, the compensation part 153 generates the fourth R-grayscale compensation data $G_{R31}(n)$, when the R-grayscale data $G_R(n)$ of the n-th frame and the R-grayscale data $G_R(n-1)$ of the (n−1)-th frame satisfy the conditions of the first boundary area B1.

The fourth R-grayscale compensation data $G_{R31}(n)$ may be calculated by bilinear interpolation as shown in Equation 1.

Equation 1

$$\text{If } (C1 > F_{01})$$

$$\begin{aligned} G_{R31}(n) &= C1 + \left(G_R(n) - \left(CF_{ref1} + 1 - N_P\right)\right) \times \left(\frac{+D_{CF1}}{N_P}\right) + D_{CF1} \\ &= C1 - F_{01} \end{aligned}$$

$$\text{else}$$

$$\begin{aligned} G_{R31}(n) &= C1 + \left(G_R(n) - \left(CF_{ref1} + 1 - N_P\right)\right) \times \left(\frac{-D_{CF1}}{N_P}\right) - D_{CF1} \\ &= F_{01} - C1 \end{aligned}$$

Here, 'C1' is the first compensation data stored in the first area A1, '$N_P = PF_{ref2} - PF_{ref1}$' is a grayscale difference between the first and second previous reference values $PF_{ref1}$ and $PF_{ref2}$, '$F_{01}$' is the first reference data stored in the first boundary area B1, and '$D_{CF1} = C1 - F_{01}$' is a difference between the first compensation data C1 and the first reference data $F_{01}$. Equation 1 may be more simply expressed as $G_{R31}(n) = |C1 - F_{01}| = |D_{CF1}|$, where the || represents an absolute value function.

The compensation part 153 generates the fifth R-grayscale compensation data $G_{R32}(n)$, when the R-grayscale data $G_R(n)$ of the n-th frame and the R-grayscale data $G_R(n-1)$ of the (n−1)-th frame satisfy the conditions of the second boundary area B2.

The fifth R-grayscale compensation data $G_{R32}(n)$ may be calculated by bilinear interpolation as shown in Equation 2.

Equation 2

$$\text{If } (C1 > F_{02})$$

$$\begin{aligned} G_{R32}(n) &= C1 - (G_R(n-1) - PF_{ref1}) \times \left(\frac{+D_{CF2}}{N_C}\right) + D_{CF2} \\ &= C1 - F_{02} \end{aligned}$$

$$\text{else}$$

$$\begin{aligned} G_{R32}(n) &= C1 + (G_R(n-1) - PF_{ref1}) \times \left(\frac{-D_{CF2}}{N_C}\right) - D_{CF2} \\ &= F_{02} - C1 \end{aligned}$$

Similarly with Equation 1, 'C1' is the first compensation data stored on the first area A1, '$N_C = CF_{ref1} - CF_{ref2}$' is a grayscale difference between the first current reference value $CF_{ref1}$ and the second current reference value $CF_{ref2}$, '$F_{02}$' is the second reference data stored in the second boundary area B2, and '$D_{CF2} = C1 - F_{02}$' is a difference between the first compensation data C1 and the second reference data $F_{02}$. Equation 2 may also be more simply expressed as $G_{R32}(n) = |C1 - F_{02}| = |D_{CF2}|$.

The compensation part 153 generates the sixth R-grayscale compensation data $G_{R33}(n)$, when the R-grayscale data $G_R(n)$ of the n-th frame and the R-grayscale data $G_R(n-1)$ of the (n−1)-th frame satisfy the conditions of the third boundary area B3.

Figure 4:
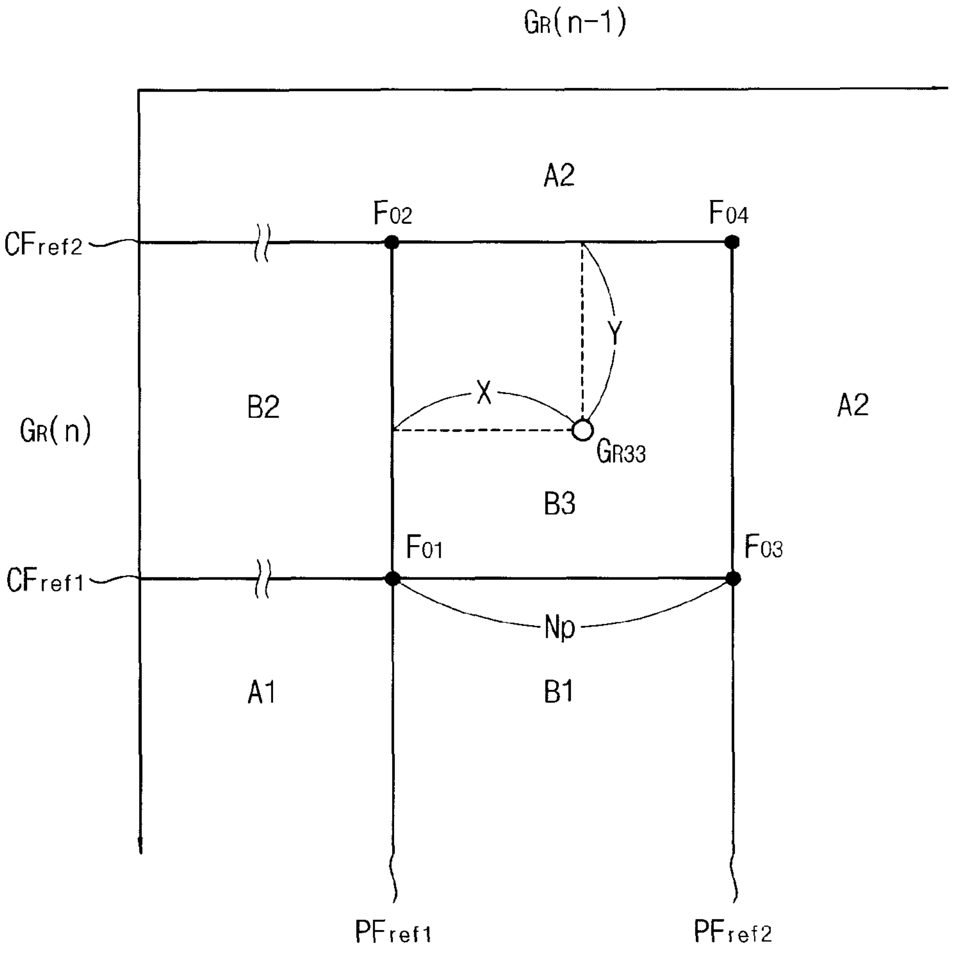
FIG. 4 is a conceptual diagram showing a method of generating compensation data for grayscale data corresponding to a third boundary area as shown in FIG. 3.

FIG. 4 is a conceptual diagram showing a method of generating compensation data for grayscale data corresponding to a third boundary area as shown in FIG. 3.

Referring to FIGS. 3 and 4, when an R-grayscale data $G_R$(n−1) of the (n−1)-th frame and an R-grayscale data $G_R$(n) of the n-th frame satisfy the conditions of the third boundary area B3, the compensation part 153 may calculate the sixth R-grayscale compensation data $G_{R33}$(n) using bilinear interpolation using R-grayscale data $G_R$(n−1) of the (n−1)-th frame, R-grayscale data of the n-th frame and the first to fourth reference data $F_{01}$, $F_{02}$, $F_{03}$ and $F_{04}$ that are stored in the third boundary area B3.

The sixth R-grayscale compensation data $G_{R33}$(n) may be calculated using bilinear interpolation method as shown in Equation 3.

$$G_{R33}(n) = C2 + a\times\left(\frac{X}{N_P}\right) + b\times\left(\frac{Y}{N_C}\right) + c\times\left(\frac{X\times Y}{N_P\times N_C}\right) \quad \text{Equation 3}$$

$$a = F_{03} - F_{01}$$

$$b = F_{02} - F_{01}$$

$$c = F_{01} + F_{04} - F_{03} - F_{02}$$

$$X = G_R(n-1) - PF_{ref1}$$

$$Y = N_C - (CF_{ref1} - G_R(n))$$

In Equation 3, 'C2' is the second compensation data stored on the second area A2.

The second and third data compensation parts 154 and 156 are substantially the same as the first data compensation part 152 except for different colors of grayscale data to be compensated. Thus, any repetitive detailed explanation thereof may hereinafter be omitted. The second data compensation part 154 includes a LUT from which compensation data and reference data are mapped as functions of G-grayscale data $G_G$(n) of an n-th frame and G-grayscale data $G_G$(n−1) of an (n−1)-th frame. The third data compensation part 156 includes a LUT from which compensation data and reference data are mapped as functions of B-grayscale data $G_B$(n) of an n-th frame and B-grayscale data $G_B$(n−1) of an (n−1)-th frame.

Figure 5:
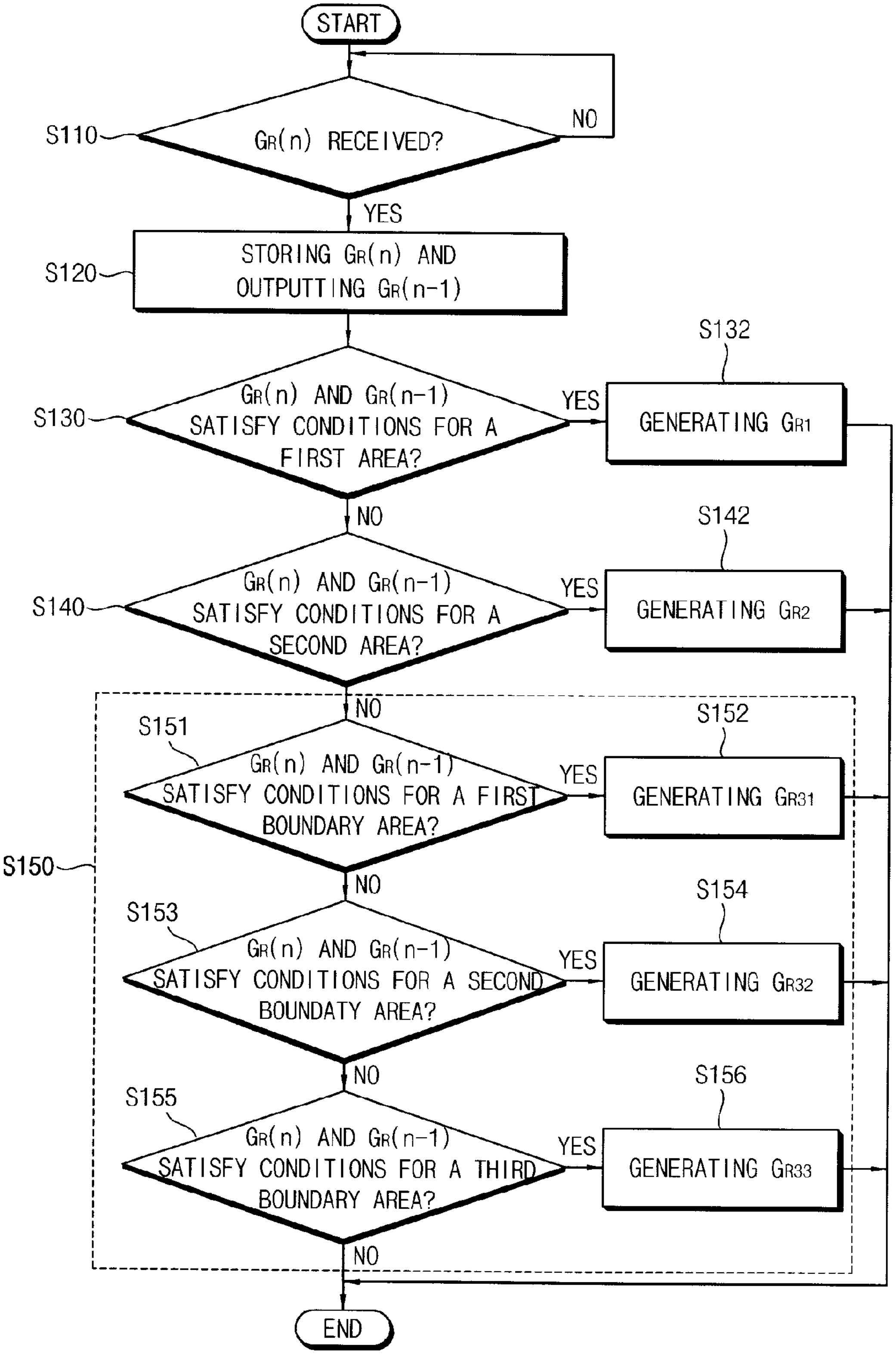
FIG. 5 is a flowchart illustrating a driving method of a data compensation part as shown in FIG. 2.

FIG. 5 is a flowchart explaining a driving method of a data compensation part as shown in FIG. 2.

Referring to FIGS. 2 and 5, step S110 checks whether R-grayscale data $G_R$(n) of an n-th frame has been received from an external device (not shown). When R-grayscale data $G_R$(n) of the n-th frame has been received from the external device, the memory 151 stores R-grayscale data $G_R$(n) of the n-th frame and outputs R-grayscale data $G_R$(N−1) of an (n−1)-th frame at step S120.

Then, step S130 checks whether the R-grayscale data $G_R$(n) of the n-th frame and the R-grayscale data $G_R$(n−1) of the (n−1)-th frame satisfy the conditions for the first area A1. If the R-grayscale data $G_R$(n) of the n-th frame and the R-grayscale data $G_R$(n−1) of the (n−1)-th frame do satisfy the conditions for the first area A1, the compensation part 153 generates the first R-grayscale compensation data $G_{R1}$(n) at step S132.

If the R-grayscale data $G_R$(n) of the n-th frame and the R-grayscale data $G_R$(n−1) of the (n−1)-th frame do not satisfy the conditions for the first area A1 in step S130, step S140 checks whether the R-grayscale data $G_R$(n) of the n-th frame and the R-grayscale data $G_R$(n−1) of the (n−1)-th frame satisfy the conditions for the second area A2. If the R-grayscale data $G_R$(n) of the n-th frame and the R-grayscale data $G_R$(n−1) of the (n−1)-th frame do satisfy the conditions for the second area A2, the compensation part 153 generates the second R-grayscale compensation data $G_{R2}$(n) at step S142.

If the R-grayscale data $G_R$(n) of the n-th frame and the R-grayscale data $G_R$(n−1) of the (n−1)-th frame do not satisfy the conditions for the second area A2 in step S140, step S150 checks whether the R-grayscale data $G_R$(n) of the n-th frame and the R-grayscale data $G_R$(n−1) of the (n−1)-th frame satisfy the conditions for the boundary area B, and the compensation part 153 generates the third R-grayscale compensation data using the first to fourth reference data $F_{01}$, $F_{02}$, $F_{03}$ and $F_{04}$.

For example, if the R-grayscale data $G_R$(n) of the n-th frame and the R-grayscale data $G_R$(n−1) of the (n−1)-th frame do not satisfy the conditions for to the second area A2, step S151 checks whether the R-grayscale data $G_R$(n) of the n-th frame and the R-grayscale data $G_R$(n−1) of the (n−1)-th frame satisfy the conditions for the first boundary area B1. If the R-grayscale data $G_R$(n) of the n-th frame and the R-grayscale data $G_R$(n−1) of the (n−1)-th frame do satisfy the conditions for the first boundary area B1, the driving compensation part 153 linearly interpolates the fourth R-grayscale compensation data $G_{R31}$(n) using R-grayscale data $G_R$(n) of the n-th frame, a first compensation data C1 stored in the first area A1, the first current reference value $CF_{ref1}$, the first and second previous reference values $PF_{ref1}$ and $PF_{ref2}$, and a first reference data $F_{01}$ stored in the first boundary area B1 at step S152.

If the R-grayscale data $G_R$(n) of the n-th frame and the R-grayscale data $G_R$(n−1) of the (n−1)-th frame do not satisfy the conditions for to the first boundary area B1, step S153 checks whether the R-grayscale data $G_R$(n) of the n-th frame and the R-grayscale data $G_R$(n−1) of the (n−1)-th frame satisfy the conditions for the second boundary area B2. If the R-grayscale data $G_R$(n) of the n-th frame and the R-grayscale data $G_R$(n−1) of the (n−1)-th frame do satisfy the conditions for to the second boundary area B2, the compensation part 153 linearly interpolates the fifth R-grayscale compensation data $G_{R32}$(n) using R-grayscale data $G_R$(n−1) of the (n−1)-th frame, a first compensation data C1 stored in the first area A1, the first previous reference value $PF_{ref1}$, the first and second current reference values $CF_{ref1}$ and $CF_{ref2}$, and the second reference data $F_{02}$ stored in the second boundary area B2 at step S154.

If the R-grayscale data $G_R$(n) of the n-th frame and the R-grayscale data $G_R$(n−1) of the (n−1)-th frame do not satisfy the conditions for the second boundary area B2 in step S153, step S155 checks whether the R-grayscale data $G_R$(n) of the n-th frame and the R-grayscale data $G_R$(n−1) of the (n−1)-th frame satisfy the conditions for the third boundary area B3. If the R-grayscale data $G_R$(n) of the n-th frame and the R-grayscale data $G_R$(n−1) of the (n−1)-th frame do satisfy the conditions for the third boundary area B3, the compensation part 153 bilinearly interpolates the sixth R-grayscale compensation data $G_{R33}$(n) using R-grayscale data $G_R$(n−1) of the (n−1)-th frame, R-grayscale data $G_R$(n) of the n-th frame, and the first to fourth reference data $F_{01}$, $F_{02}$, $F_{03}$ and $F_{04}$ that are stored in the third boundary area B3, the first and second current reference values $CF_{ref1}$ and $CF_{ref2}$, and the first and second previous reference values $PF_{ref1}$ and $PF_{ref2}$, at step S156.

As described above, according to the exemplary embodiments of the present invention, different compensation data are calculated as functions of grayscale data of a previous frame and grayscale data of a current frame, so that a response speed of a liquid crystal may be enhanced without changing the structure of a display panel or the physical properties of the liquid crystal.

Moreover, additional compensation data are generated as functions of R, G and B grayscale data to prevent display defects which are generated due to different response speeds of R, G and B pixels with respect to identical grayscale data. Thus, display quality may be enhanced.

Furthermore, compensation data are generated using linear interpolation when the previous frame data and the current frame data correspond to a boundary area between a first area that compensates a pretilt method and a second area that compensates an overdriving method, so that compensation data corresponding to the boundary area may prevent blurring from being generated at the boundary area.

The foregoing is illustrative of the exemplary embodiments of the present invention and is not to be construed as limiting thereof. Although a few exemplary embodiments of the present invention have been described, those skilled in the art will readily appreciate that many modifications are possible in the exemplary embodiments without materially departing from the novel teachings of the exemplary embodiments of the present invention. Therefore, it is to be understood that the foregoing is illustrative of the exemplary embodiments of the present invention and is not to be construed as limited to the specific exemplary embodiments disclosed, and that modifications to the disclosed exemplary embodiments, as well as other exemplary embodiments, are intended to be included within the scope of the appended claims. The exemplary embodiments of the present invention are defined by the following claims, with equivalents of the claims to be included therein.

What is claimed is:

1. A method of compensating data, the method comprising:

providing a look-up table divided into a first area, a second area and a boundary area between the first and second areas, said first, second and boundary areas being generated by a first previous reference value, a second previous reference value greater than the first previous reference value, a first current reference value and a second current reference value less than the first current reference value; and generating compensation data for a current frame based on whether grayscale data of said current frame and of a previous frame satisfy a condition for one of the first, second or boundary areas, wherein the condition for the first area is that grayscale data of the previous frame has a value less than the first previous reference value and the grayscale data of the current frame has a value greater than a first current reference value, the condition for the second area is that grayscale data of the previous frame has a value greater than the second previous reference value and grayscale data of the current frame has a value less than a second current reference value, or that grayscale data of the previous frame has a value greater than the second previous reference value and grayscale data of the current frame has a value greater than a second current reference value, or that grayscale data of the previous frame has a value less than the second previous reference value and grayscale data of the current frame has a value less than a second current reference value, and the condition for the boundary area is that grayscale data of the previous frame has a value between the first and second previous reference values, or that grayscale data of the current frame has a value between the first and second current reference values, the boundary area being between the first and second areas.

2. The method of claim 1, wherein generating the compensation data comprises:

generating a first compensation data when grayscale data of the previous and current frames satisfy the condition for the first area;

generating a second compensation data when grayscale data of the previous and current frames satisfy the condition for the second area; and generating a third compensation data when grayscale data of the previous and current frames satisfy the condition for the boundary area.

3. The method of claim 2, wherein the condition for the boundary area is that grayscale data of the previous frame has a value between the first and second previous reference values and grayscale data of the current frame has a value between the first and second current reference values or that grayscale data of the previous frame has a value between the first and second previous reference values and grayscale data of the current frame has a value greater than the first current reference value, or that grayscale data of the current frame has a value between the first and second current reference values and grayscale data of previous frame has a value less than the first previous reference value.

4. The method of claim 2, wherein generating the third compensation data comprises:

generating a fourth compensation data when grayscale data of the previous frame has a value between the first and second previous reference values and grayscale data of the current frame has a value greater than the first current reference value;

generating a fifth compensation data when grayscale data of the previous frame is less than the first previous reference value and grayscale data of the current frame has a value between the first and second current reference values; and generating a sixth compensation data when grayscale data of the previous frame has a value between the first and second previous reference values and grayscale data of the current frame has a value between the first and second current reference values.

5. The method of claim 4, wherein said fourth compensation data is a function of the grayscale value of the current frame, the first compensation data, the first current reference value, a first preset reference data, and a difference between the first and second previous reference values, said fifth compensation data is a function of the grayscale value of the previous frame, the first compensation data, the first previous reference value, a second preset reference data, and a difference between the first and second current reference values, and said sixth compensation data is a function of the grayscale values of the previous and current frames, the second compensation data, the first previous and current reference values, the first and second preset reference data, third and fourth preset reference data, and the differences between the first and second previous reference values and the first and second current reference values.

6. The method of claim 2, wherein the grayscale data comprises red-grayscale data, green-grayscale data and blue-grayscale data, and the first to third compensation data have the different values depending on the red, green and blue grayscale data values, respectively.

7. The method of claim 2, wherein the first compensation data comprises one preset grayscale value.

8. The method of claim 2, wherein the second compensation data is a varying function of the grayscale data of the previous frame and the grayscale data of the current frame.

9. A display apparatus for compensating display data, comprising:

a frame memory for storing grayscale data of a previous frame;

a look-up table divided into a first area, a second area and a boundary area between the first and second areas, said first, second, and boundary areas being generated by a first previous reference value, a second previous reference value greater than the first previous reference value, a first current reference value and a second current reference value less than the first current reference value; and a compensation part configured to generate compensation data for a current frame based on whether grayscale data of said current frame and of said previous frame satisfy a condition for one of the first, second or boundary areas, wherein the condition for the first area is that grayscale data of the previous frame has a value less than the first previous reference value and the grayscale data of the current frame has a value greater than a first current reference value, the condition for the second area is that grayscale data of the previous frame has a value greater than the second previous reference value and grayscale data of the current frame has a value less than a second current reference value, or that grayscale data of the previous frame has a value greater than the second previous reference value and grayscale data of the current frame has a value greater than a second current reference value, or that grayscale data of the previous frame has a value less than the second previous reference value and grayscale data of the current frame has a value less than a second current reference value, and the condition for the boundary area is that grayscale data of the previous frame has a value between the first and second previous reference values, or that grayscale data of the current frame has a value between the first and second current reference values, the boundary area being between the first and second areas.

10. The display apparatus of claim 9, wherein the compensation part generates a first compensation data when grayscale data of the previous and current frames satisfy the condition for the first area, generates a second compensation data when grayscale data of the previous and current frames satisfy the condition for the second area, and generates a third compensation data when grayscale data of the previous and current frames satisfy the condition for the boundary area.

11. The display apparatus of claim 10, wherein the condition for the boundary area is that grayscale data of the previous frame has a value between the first and second previous reference values and grayscale data of the current frame has a value between the first and second current reference values or that grayscale data of the previous frame has a value between the first and second previous reference values and grayscale data of the current frame has a value greater than the first current reference value, or that grayscale data of the current frame has a value between the first and second current reference values and grayscale data of previous frame has a value less than the first previous reference value.

12. The display apparatus of claim 11, wherein the third compensation data include a fourth compensation data, a fifth compensation data, and a sixth compensation data, wherein the compensation part generates the fourth compensation data when grayscale data of the previous frame has a value between the first and second previous reference values and grayscale data of the current frame has a value greater than the first current reference value, generates the fifth compensation data when grayscale data of the previous frame is less than the first previous reference value and grayscale data of the current frame has a value between the first and second current reference values, and generates the sixth compensation data when grayscale data of the previous frame has a value between the first and second previous reference values and grayscale data of the current frame has a value between the first and second current reference values.

13. The display apparatus of claim 12, wherein said fourth compensation data is a function of the grayscale value of the current frame, the first compensation data, the first current reference value, a first preset reference data, and a difference between the first and second previous reference values, said fifth compensation data is a function of the grayscale value of the previous frame, the first compensation data, the first previous reference value, a second preset reference data, and a difference between the first and second current reference values, and said sixth compensation data is a function of the grayscale values of the previous and current frames, the second compensation data, the first previous and current reference values, the first and second preset reference data, third and fourth preset reference data, and the differences between the first and second previous reference values and the first and second current reference values.

14. The display apparatus of claim 10, wherein said first compensation data is a preset grayscale value.

15. The display apparatus of claim 8, further comprising:

a first data compensation part configured to generate compensation data for red-grayscale data;

a second data compensation part configured to generate compensation data for green-grayscale data; and a third data compensation part configured to generate compensation data for blue-grayscale data, wherein each of the first to third data compensation parts comprises said frame memory, said look up table and said compensation part.

16. The display apparatus of claim 9, further comprising:

a display panel configured to display images;

a data driving part configured to convert the first to third compensation data into an analog data signal and output the data signal to the display panel; and a gate driving part configured to output a gate signal to the display panel synchronized with the output of the data driving part.

* * * * *